April 27, 1926.
J. D. KARLE
1,582,051
FUEL RESERVE DEVICE FOR MOTOR VEHICLES
Filed May 21, 1925      2 Sheets-Sheet 1
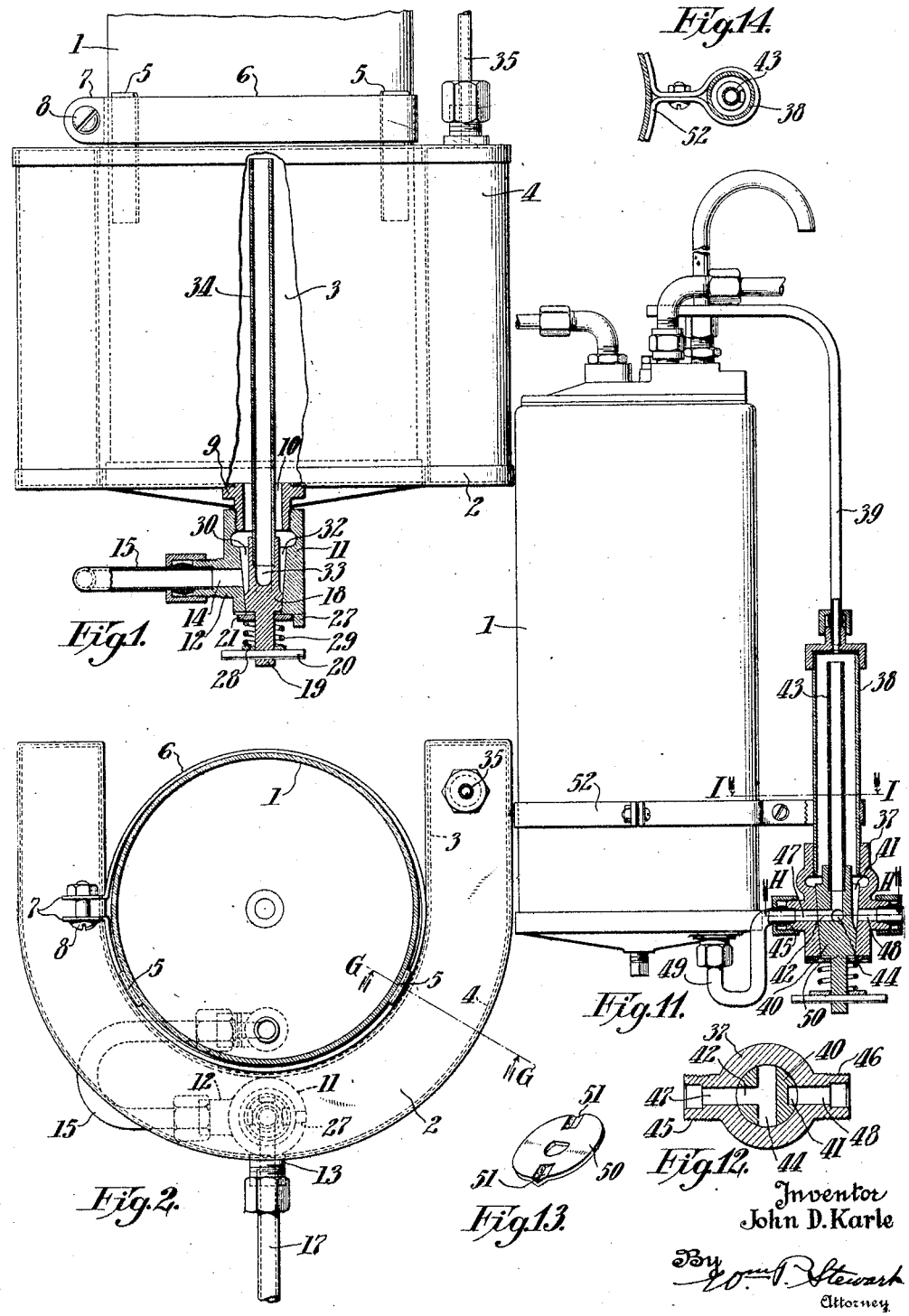
Inventor
John D. Karle April 27, 1926.
J. D. KARLE
1,582,051
FUEL RESERVE DEVICE FOR MOTOR VEHICLES
Filed May 21, 1925      2 Sheets-Sheet 2
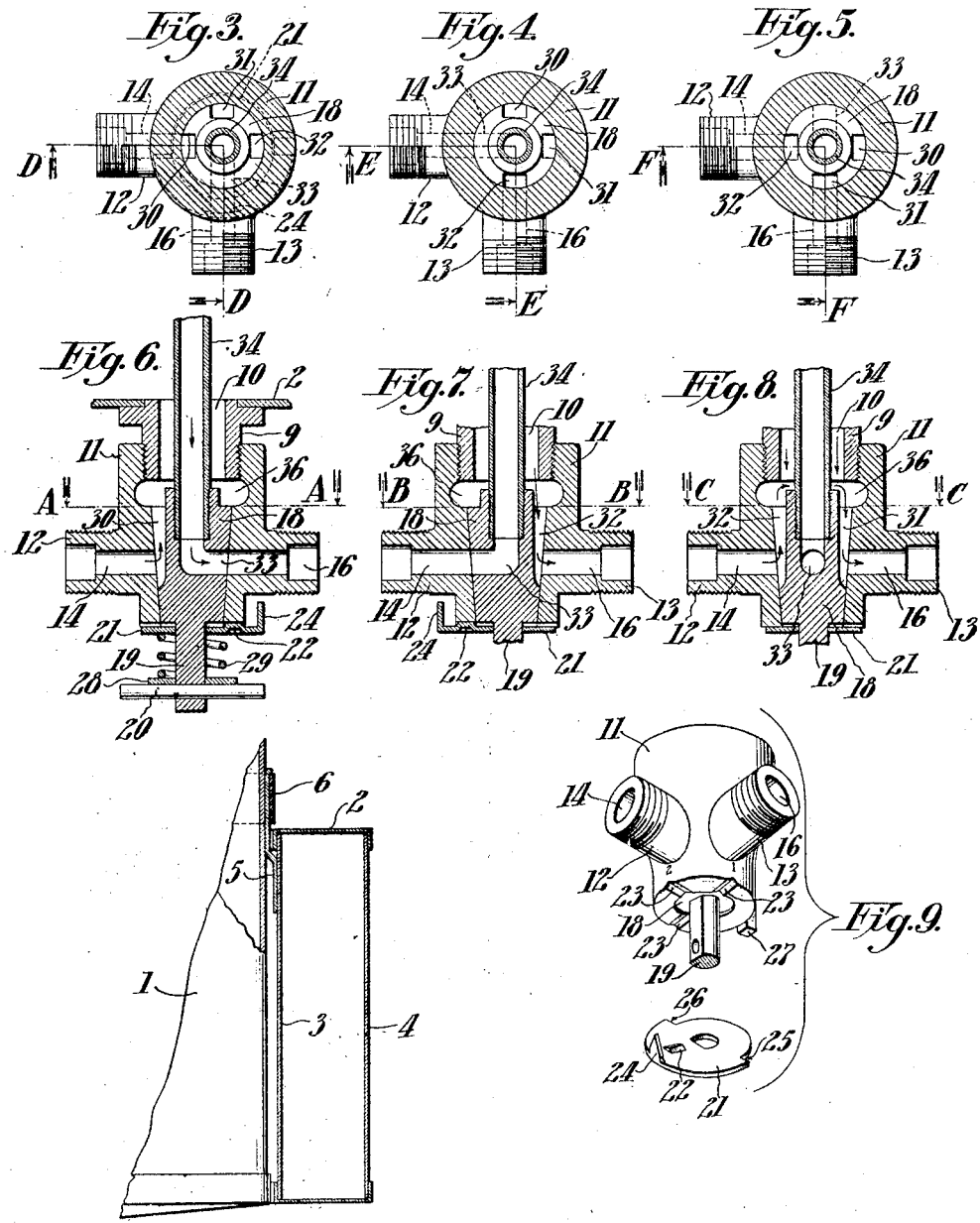
Inventor
John D. Karle Patented Apr. 27, 1926.

1,582,051

UNITED STATES PATENT OFFICE.

JOHN D. KARLE, OF ROSELLE PARK, NEW JERSEY.

FUEL RESERVE DEVICE FOR MOTOR VEHICLES.

Application filed May 21, 1925. Serial No. 31,854.

*To all whom it may concern:*

Be it known that I, JOHN D. KARLE, a citizen of the United States, residing at Roselle Park, in the county of Union and State of New Jersey, have invented certain new and useful Improvements in Fuel Reserve Devices for Motor Vehicles, of which the following is a specification, reference being had therein to the accompanying drawings.

This invention relates to improvements in reserve fuel-supply devices for motor driven vehicles and while adapted for use with the main fuel-tank of a vehicle of this character, it is more particularly designed for use in connection with the vacuum-tank at present commonly employed as auxiliary to the main fuel-tank.

The primary object of the invention is to provide improved means for insuring a reserve fuel-supply for emergency use. More specifically, the present invention comprehends the provision of a fuel-flow controlling device of such a character as to not only insure a reserve supply in the fuel-tank but also in an additional reserve tank, which controlling device may be manipulated to utilize the fuel in said reserve-tank without depleting the reserve-supply in the fuel-tank, or which may be manipulated to utilize the supply in both the fuel-tank and the reserve-tank.

A further object of the invention is to provide a reserve-tank which is so designed as to contain an adequate fuel-supply and to occupy a minimum of space, although capable of being embodied in vehicles in use.

A still further object of the invention is to provide an improved fuel-controlling valve of simple construction but having a multiple of functions.

Other and more specific objects of the invention will be apparent from the following description and claims.

In its preferred embodiment the present invention is employed in connection with the vacuum-tank of an automobile, and comprises a reserve-tank of which at least one wall is curved to conform to the curvature of the vacuum-tank casing, whereby said reserve-tank may embrace or partially embrace the vacuum-tank. The reserve-tank is preferably secured in vacuum-tank embracing position by suitable clamps which may readily accommodate slight variations in the sizes of vacuum-tanks.

In vacuum-tank constructions commonly employed in commercial usage, the lower end of said tank has direct connections with the carbureter. Consequently there is present a likelihood, through an oversight on the part of the vehicle-operator, that the entire fuel-supply may become exhausted at inopportune times. While this is in itself an inconvenient and frequently embarrassing as well as dangerous situation, a more serious incident thereto is the fact that the draining of the vacuum-tank draws into the carbureter an accumulation of sediment which clogs the carbureter parts and necessitates a thorough cleaning of the same.

According to the present improvement, the above described defect is entirely obviated, the vacuum-tank being incapable of being drained except at the will of the operator, while at the same time an additional or reserve supply of fuel is provided which may also be at will utilized by the operator. To this end, the lower end of the vacuum-tank is connected with a reserve tank through the intermediary of a specially constructed valve which also controls the flow of the fuel to the carbureter.

In the accompanying drawings, Fig. 1 is a view in elevation and partly in section of the preferred embodiment of the invention as applied to a vacuum-tank of any well known construction. Fig. 2 is a top plan view of the reserve-tank, with the vacuum-tank in section. Figs. 3, 4 and 5 are transverse sectional views of the fuel-controlling valve, substantially on the lines A—A, Fig. 6; B—B, Fig. 7, and C—C, Fig. 8, respectively. Figs. 6, 7 and 8 are longitudinal sectional views of the valve, substantially on the lines D—D, Fig. 3; E—E, Fig. 4 and F—F, Fig. 5, respectively. Fig. 9 is a perspective view of the valve, showing the indexing washer in detached relationship. Fig. 10 is a sectional view of the reserve-tank substantially on the line G—G, Fig. 2. Fig. 11 is a longitudinal section of a modified form of valve construction, in connection with a view in elevation of a vacuum-tank which modified valve may be employed in case it is desired to retain a reserve supply of fuel in the vacuum-tank only. Fig. 12 is a sectional view of the modified valve substantially on the line H—H, Fig. 11. Fig. 13 is a perspective view of the indexing washer embodied in the valve of Fig. 11. Fig. 14 is a sectional view substantially on the line I—I, Fig. 11.

Referring to the drawings, the preferred embodiment of the invention is illustrated in Figs. 1 to 10, inclusive. The vacuum-tank 1 may be of any suitable or well known construction, receiving a supply of fuel from a main fuel-tank (not shown). The casing of the vacuum-tank is usually of cylindrical form and in conformity therewith, there is provided a reserve-tank 2 of which at least the inner wall 3 is of similar outline, and the outer well 4 is preferably though not necessarily parallel therewith. Projecting above the top of the reserve-tank 2 and suitably secured to the inner wall 3 thereof are a plurality of supporting-arms 5, engaged by a band-clamp 6 having offset, apertured ears, as 7, entered by a screw-bolt 8 for securing the reserve-tank upon the casing of the vacuum-tank 1.

Fixed in a suitable aperture in the bottom wall of the reserve-tank 2 is a flanged nipple 9 having an aperture 10 communicating with the interior of said tank. Threaded upon the nipple 9 is a valve-casing 11 provided with lateral bosses 12 and 13 projecting from said casing in substantially transverse directions. The boss 12 is apertured to provide an inlet-port 14 and is coupled in regulation manner with a conduit 15 which is connected as usual with the bottom of the vacuum-tank 1. The boss 13 is also apertured to provide an outlet-port 16 substantially at the same level as the inlet port 14, and is coupled to a conduit 17 which is connected in the usual manner with the carbureter (not shown). The valve-casing 11 is formed with a vertically disposed, tapered bore affording a seat for a similarly shaped valve-member 18 terminating at its lower end in a reduced and slabbed extension 19 in which is fixed a transverse valve-turning pin 20. Disposed upon the valve-extension 19 so as to rotate therewith is an indexing washer 21 having on one face thereof a V-shaped lug 22 adapted to register with any one of a plurality of notches 23 provided on the lower face of the valve-casing 11. The washer 21 is formed with an offset pointer 24 for indicating the valve-position and is preferably provided with stop-shoulders 25 and 26 adapted to alternately engage a stop-lug 27 depending from the valve-casing 11. The shoulders 25 and 26 are preferably spaced slightly more than 180° to permit of turning of the valve 18 a distance equal to substantially 180°. Interposed between the washer 21 and a supporting-washer 28 above the pin 20 is a coil-spring 29 acting to normally retain the valve-member 18 seated in adjusted position.

The outer periphery of the valve-member 18 is provided with three grooves 30, 31, 32 which extend from the upper edge of said member 18 to a point slightly below the inlet and outlet ports 14 and 16, said grooves constituting external valve-ports. The valve-member 18 is also provided with an angular, interior valve-port 33 of which a horizontal portion is disposed to alternately communicate with the inlet-port 14 and the outlet-port 16. Threaded into the upper end of the valve-member 18 so as to communicate with the interior valve-port 33 is a tube 34 which extends through the nipple-aperture 10 and into the interior of the reserve-tank 2 to a point slightly below the top wall of said reserve-tank. Rising from the reserve-tank 2 is the usual vent-pipe 35.

In the normal course of operation of an automobile in which the described improvement has been embodied, the index-washer pointer 24 is set at (1), in which position the washer-shoulder 25 is in engagement with the stop-lug 27. In this position, the valve-member 18 is disposed as indicated in Figs. 1, 3 and 6, and in such a manner that the external valve-port 30 communicates with the inlet-port 14, and that the interior valve-port 33 communicates with the outlet-port 16. It will be readily apparent that in this valve-position, fuel will flow from the usual lower chamber of the vacuum-tank 1, through the conduit 15 into the inlet-port 14; thence upwardly through the external-port 30 and nipple-aperture 10 into the interior of the reserve-tank 2, it being understood that the port 30 and aperture 10 communicate by virtue of a chamber 36 formed in the valve-casing 11. When the reserve-tank 2 is substantially full, the fuel will enter the upper end of the tube 34 which preferably is of a height proportionate with the lowest normal position of the fuel in the lower chamber of the vacuum-tank. The fuel thereupon flows through the angular interior-port 33 and outlet-port 16 to the carbureter. Should the fuel in the main fuel-tank become exhausted or fail for any reason, it will be apparent that a quantity of fuel substantially equal to the height of the tube 34 will be retained in both the outer chamber of the vacuum-tank 1 and in the reserve-tank 2 when the engine stalls for lack of fuel. Consequently there is a very substantial quantity of fuel available to reach a repair or refilling station.

Now should it be desired to avoid draining of the vacuum-tank 1 and to utilize only the reserve supply in the tank 2, the valve-member 18 is turned approximately 90°, i. e., until the pointer is located at (2) or is in a position half-way between its positions of extreme throw. This position of the valve-member 18 is illustrated in Figs. 4 and 7. It will be observed that the interior valve-port 33 is now in communication with the inlet-port 14, but as the level of the fuel in the vacuum-tank is at this time slightly below the top of the tube 34, it will be evident that the remaining fuel-supply in the vacuum-tank cannot be drained in this position of the valve-member 18. However, the fuel in the reserve-tank 2 will flow downwardly through the nipple-aperture 10 into the external-port 32 and through the outlet-port 16 to the carbureter.

The quantity of fuel furnished by the reserve-tank 2 would be sufficient for all ordinary purposes, but occasions may arise when still more fuel is desired. In this case, the valve-member 18 is turned until the shoulder 26 contacts with the lug 27, i. e., approximately 180° from its initial or normal position. See Figs. 5 and 8. It will now be observed that the vacuum-tank supply of fuel may drain through the inlet-port 14, external valve-port 32, chamber 36, external valve-port 31 and outlet-port 16 to the carbureter. Attention is also directed to the fact that should the valve-member 18 be turned from the initial position of Figs. 3 and 6 to the final position of Figs. 5 and 8 when it is first desired to utilize the reserve supply of fuel, both the reserve-tank and the vacuum-tank may be drained by this one adjustment of the valve-member 18. Consequently, there is herein provided a reserve fuel-supply device which not only conserves space, but has many inherent advantages aside from its simple character and commercially practical construction.

The modification illustrated in Figs. 11 to 14, inclusive, provides a valve-construction which may be employed in case it is desired to retain a reserve supply of fuel in the vacuum-tank only. A valve-casing 37 is apertured to receive a vertically disposed cylindrical casing-extension 38 connected at its upper end with a suitable vent-pipe 39. The tapered valve-member 40 which is seated in a correspondingly shaped aperture provided therefor in the valve-casing 37 has only one external groove or valve-port 41, and its angular internal port 42 which communicates with the tube 43 is intersected by a diametrical discharge-port 44. As in the preferred embodiment of the invention the valve-casing has lateral bosses 45 and 46 which are apertured to respectively provide an inlet port 47 and an outlet port 48, although in the modification said inlet and outlet ports are preferably disposed in alinement instead of transverse to each other. The inlet-port 47 is connected by means of a conduit 49 with the bottom of the vacuum-tank 1, while the outlet-port 48 is connected with the carbureter in the usual manner. No stop-lug need be provided on the valve-casing, the index-washer 50 being provided with diametrically opposite V-shaped lugs 51 for registering the positions of the valve-member 40 in connection with correspondingly shaped recesses provided on the bottom face of the valve-casing. The modified valve may be supported by the vacuum tank 1 by securing the casing-extension 38 to a suitable band-clamp 52 surrounding said vacuum-tank.

The normal position of the valve-member 40 is illustrated in Figs. 11 and 12. In this position, the fuel will flow from the bottom of the vacuum-tank through the conduit 49 into the inlet-port 47, thence into the internal valve-port 42 and up through the tube 43 until it spills in the manner of a fountain into the chamber provided by the cylindrical casing-extension 38. The interior of the casing-extension 38 communicates with the exterior valve-port 41 through which the fuel flows into the outlet-port 48 and to the carbureter. It will be apparent that in this position of the valve-member, the fuel in the vacuum-tank must be at least at a level with the top of the tube 43 and that consequently should the main fuel-supply fail for any reason, a reserve supply in the vacuum-tank is insured. By now turning the valve-member 90°, the diametrical discharge port 44 will constitute a direct connection between the inlet and outlet ports, thereby permitting the reserve supply in the vacuum-tank to be utilized.

Having thus set forth the nature of the invention, what I claim herein is:—

1. The combination with a fuel tank of a motor vehicle, of a reserve tank, and fuel conducting connections for supplying fuel from one of said tanks to the other including a fuel-controlling valve having a carbureter-connection, said valve including a member having rotatable ports adjustable into position to permit a normal flow of fuel from the fuel tank through one of said rotatable ports to the reserve tank and from said reserve tank through another of said rotatable ports to said carbureter-connection, said valve-ports in said position being disposed with respect to said tanks to automatically insure a reserve fuel supply in both of said tanks.

2. The combination with a fuel tank of a motor vehicle, of a reserve tank, and fuel conducting connections for supplying fuel from one of said tanks to the other including a fuel-controlling valve having a carbureter-connection, said valve including a rotatable member having valve-ports one of which terminates at a point remotely above the base of the reserve tank to automatically insure a reserve fuel supply in both of said tanks, said rotatable valve-member being adjustable at will into positions (a) to permit the flow of reserve fuel from said reserve-tank only and (b) to permit of the flow of reserve fuel from both of said tanks to said carbureter-connection.

3. In a motor vehicle, a fuel-tank, and a fuel-supply controlling valve connected with said tank, said valve comprising a valve-casing having fuel inlet and outlet ports, and a valve-member rotatably journaled within said casing having a plurality of ports each adapted to be at will alined with said valve-casing inlet and outlet ports, one of said rotatable valve-member ports having a port-extension rotatable with said valve member and terminating at a point remotely above the tank base to automatically insure a reserve fuel supply in said tank.

4. In a motor vehicle, a fuel-tank, and a fuel-supply controlling valve connected with said tank, said valve comprising a valve-casing having fuel inlet and outlet ports, and a valve-member rotatably journaled within said casing having a plurality of ports adapted to be each alined with said inlet and outlet valve-casing ports, one of said rotatable valve-member ports comprising an external port formed on the periphery of the valve-member and terminating at substantially the level of the base of said tank, and another of said valve-member ports terminating in a tube extending to a point remotely above the tank-base to automatically insure a reserve fuel supply in said tank.

5. In a motor-vehicle, a tank, means for supplying fuel to and discharging fuel from said tank comprising a rotatable valve member having an external valve-port communicating in one position thereof with the interior of the tank at the base thereof, and an internal valve-port coaxial with said valve member which internal valve-port extends into the interior of the tank to a point remote from the base thereof, one of said ports constituting an inlet-port for supplying fuel to said tank and the other of said ports constituting an outlet port for discharging fuel from said tank.

6. In a motor-vehicle, a tank, means for supplying fuel to and discharging fuel from said tank including a valve-casing having inlet and outlet ports, a rotatable valve member seated in said casing having an external-port communicating with the interior of said tank, and an internal valve-port extending into the interior of the tank to a point remote from the base thereof, said valve member being capable of being rotated to alternately aline the internal and external valve-ports with the casing inlet and outlet ports.

7. In a motor-vehicle, a tank, means for supplying fuel to and discharging fuel from said tank including a valve-casing having inlet and outlet ports, a rotatable valve member seated in said casing having a plurality of external-ports communicating with the interior of said tank at the base thereof, and an internal port extending into the interior of the tank to a point remote from the base thereof, said valve member being capable of being rotated within its casing into a position wherein an external valve-port is connected with each of the casing inlet and outlet ports.

8. The combination with a motor-vehicle vacuum-tank, of a reserve-tank associated with said vacuum-tank, a valve-casing connected with both of said tanks provided with inlet and outlet ports, a rotatable valve member seated in said casing having a plurality of valve-ports communicating with the interior of the reserve-tank at the base thereof and another valve-port extending into the interior of the reserve-tank to a point remote from the base thereof, said valve-ports being variably connected with the casing inlet and outlet ports upon rotation of the valve.

In testimony whereof, I have signed my name to this specification.

JOHN D. KARLE.